Figure 3:
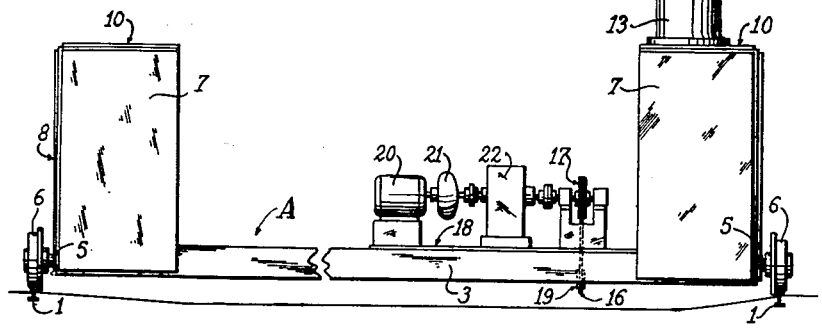

July 24, 1956 P. C. J. GILSON 2,755,945
HANDLING APPARATUS
Filed Oct. 7, 1953 4 Sheets-Sheet 1
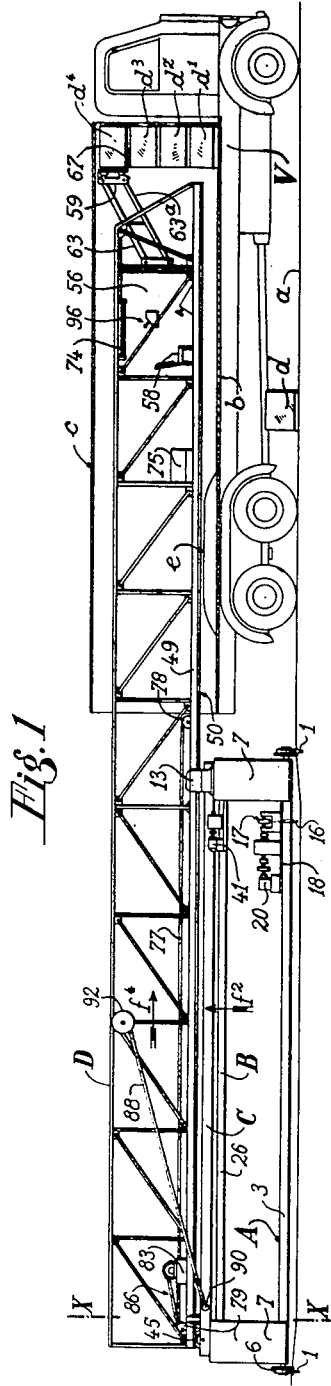
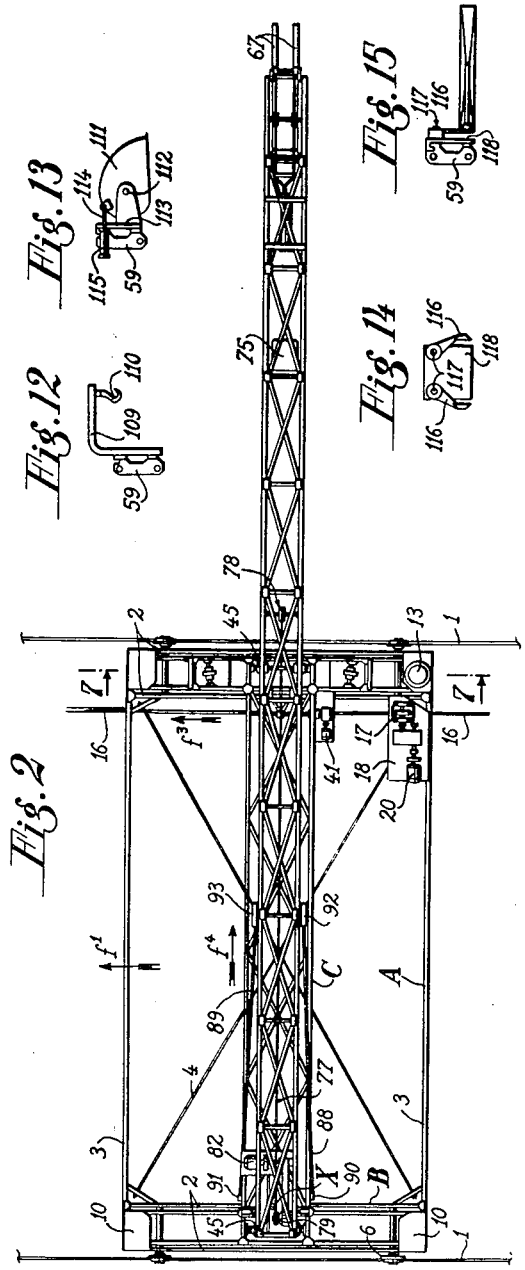

July 24, 1956 P. C. J. GILSON 2,755,945
HANDLING APPARATUS
Filed Oct. 7, 1953 4 Sheets-Sheet 2

July 24, 1956 P. C. J. GILSON 2,755,945
HANDLING APPARATUS
Filed Oct. 7, 1953 4 Sheets-Sheet 3
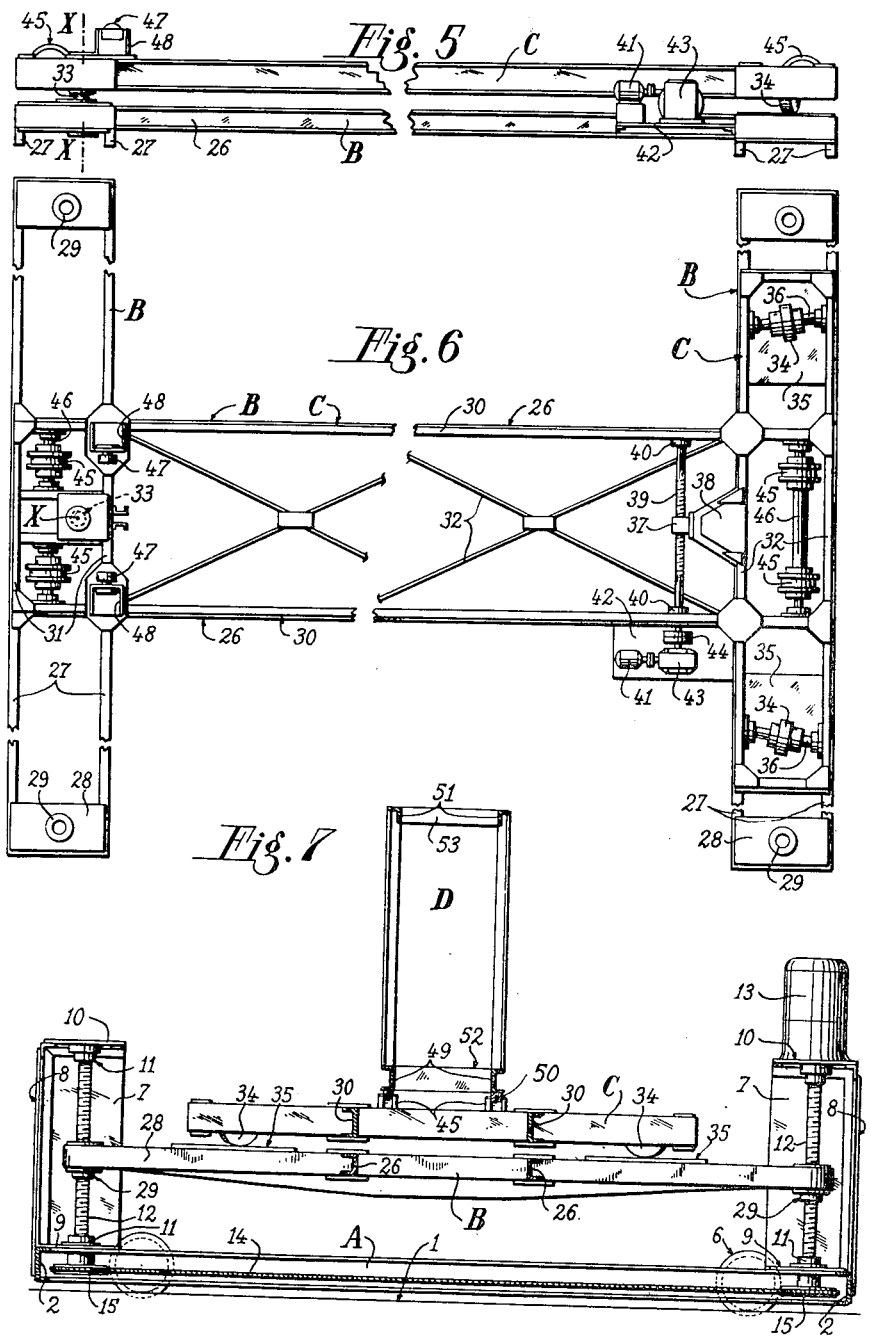

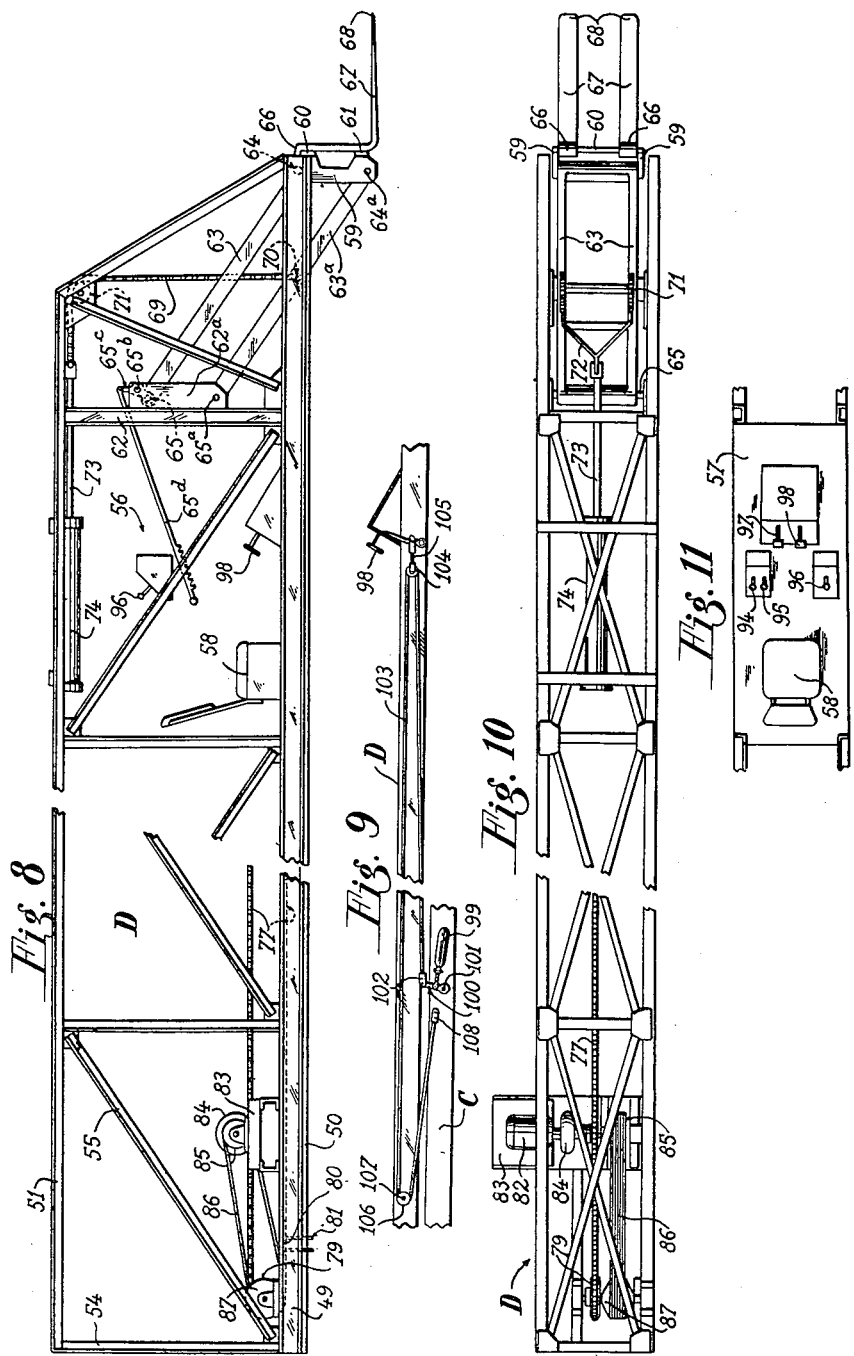

2,755,945

HANDLING APPARATUS

Pierre Charles Jean Gilson, Campagne-lez-Wardrecques par Wardrecques, France

Application October 7, 1953, Serial No. 384,669

Claims priority, application France July 20, 1953

20 Claims. (Cl. 214—132)

The present invention relates to an apparatus for handling and in particular loading on a vehicle from a storage floor heavy articles which may weigh as much as a ton or more (packets, cases and the like).

In such handling operations, it is usual practice to use either of the following apparatuses:

(a) A crane, but this does not permit loading trucks having fixed roofs. Furthermore, the loading is not accurate owing to the fact that the article is suspended at the end of a cable and is liable to swing about, requiring two men to guide it in addition to the crane operator.

(b) A lifting and transporting machine mounted on wheels and known as a lift truck. But certain vehicles have a floor which is weak or uneven in the region of the wheel arches and do not permit the use of a lifting truck. Moreover, the lifting and handling device of such a machine does not allow the articles to be lowered below the level of the wheels of this machine.

The invention has for object a handling apparatus which does not present the aforementioned disadvantages and which is in particular adapted for the loading of heavy articles into trucks and other vehicles provided with a fixed roof and a floor which may be too weak to support a heavy local load such as that transmitted by the wheel of a lift truck, or an uneven floor which does not allow the passage of the lift truck, this apparatus permitting furthermore a positive and rapid loading, one man being sufficient to effect the complete loading of a truck in several minutes.

A further object of the invention is to provide a handling apparatus which comprises a horizontal jib which is provided at its front end with at least one handling device for the article to be handled, and a control cabin, and is carried by support means so adapted as to make it possible to impart to said jib firstly, vertical, transverse and longitudinal movements of translation relative to its horizontal axis, and, secondly, a slight slewing movement about a vertical axis.

Thus it is possible, by combining the various movements of translation of the jib, to raise an article from the storage floor to the level of a vehicle, bring it in the vicinity of this vehicle, and introduce and deposit it in the latter. Owing to its pivotal mounting, the jib may be placed in a position coinciding with or parallel to the longitudinal vertical plane of symmetry of the vehicle. The jib is provided with a control cabin near its front end so that the operator of the apparatus is situated near the handling device and may therefore easily control the movements of the latter.

According to a preferred embodiment, the support means of the jib comprise in superimposed relationship a first carriage movable in translation on two fixed rails or runners, a second carriage movable in the vertical direction relative to the first carriage and a third carriage pivotally mounted about a vertical axis on the second carriage, the jib being movable along its longitudinal axis on this third carriage and this longitudinal axis being, for the mean position of the pivotal third carriage, perpendicular in plan to the rails along which the first carriage moves.

Other features and advantages of the present invention will be apparent from the ensuing description.

Figure 4:
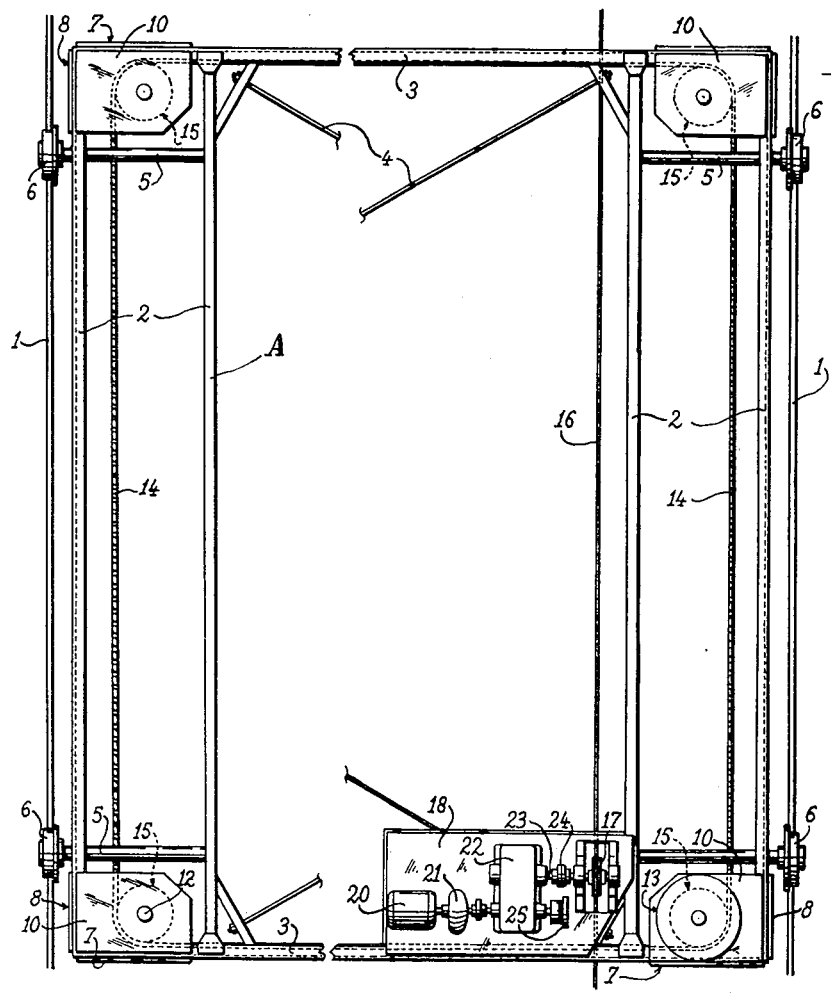

In the accompanying drawings given solely by way of example:

Fig. 1 is an elevational view, the jib being seen from the side, of a handling apparatus according to the invention, Fig. 2 is a plan view thereof, Fig. 3 is a partial elevational view, similar to that of Fig. 1 but to a larger scale, of the first or lower carriage, Fig. 4 is a corresponding plan view, Fig. 5 is an elevational view similar to that of Fig. 3 of the second and third carriages, Fig. 6 is a corresponding plan view, Fig. 7 is a vertical sectional view along line 7—7 of Fig. 2, showing the combination of the three carriages and the jib, Fig. 8 is a partial elevational view of this jib to a scale larger than that of Fig. 1, Fig. 9 is an elevational view of the control device of a brake combined with the driving device of the lower carriage, Fig. 10 is a plan view corresponding to Fig. 8, Fig. 11 is a plan view of the control cabin and corresponds to Figs. 8 and 9, and Figs. 12 to 15 represent modifications of the handling device provided at the front end of the jib.

According to the illustrated embodiment, the apparatus is adapted to displace, between a loading floor $a$ and the floor $b$ of a vehicle V, which is shown as a truck having a fixed roof $c$, articles $d$. The latter are taken from the floor $a$ and placed one on top of the other and side by side at $d^1$, $d^2$ etc. on the floor $b$ of the truck. These articles are relatively heavy, for example several hundred kilograms and even a ton and more, and may be a single object or a number of objects assembled on a platform according to the technique well known in the brick-making industry and similar industries.

The apparatus according to the invention comprises in superimposed relationship:

a. A first or lower carriage A adapted to move transversely along rails 1 in the direction of arrow $f^1$ or in the opposite direction.

b. A second carriage B adapted to move vertically either upwardly in the direction of arrow $f^2$ (Fig. 1) or downwardly relative to the carriage A.

c. A third carriage C which is capable of pivoting on the carriage B about a vertical axis XX in the direction of arrow $f^3$ (Fig. 2) or in the opposite direction.

d. A jib D movable in the longitudinal direction on the third carriage C in the direction of arrow $f^4$ or in the opposite direction.

The units A to D will now be described in turn.

a. Lower carriage A (Figs. 1, 2, 3, 4 and 7). This carriage comprises a rectangular chassis composed of two pairs of girders 2, for example U-sectioned girders, parallel to the rails 1 of the track, and two cross-girders 3 parallel to the longitudinal axis of the jib D in the mean position of the pivotal carriage C. This chassis is strengthened by tie-rods 4, and rests through the medium of spindles 5 on four flanged wheels 6 adapted to roll along rails 1. In each of its corners the carriage A carries a box comprising two vertical walls 7 and 8, a bottom 9, and a top 10. The bottom 9 and the top 10 of each box carry bearings such as 11 (Fig. 7) in which is journalled a vertical lead-screw 12. One of these lead-screws is driven in rotation by a motor and reduction gearing 13 fixed to the upper plate 10 of the corresponding box. The other three lead-screws 12 are driven in synchronism by the first lead-screw through a drive comprising an endless chain 14 and four sprockets 15 keyed to the four lead-screws.

The movements of translation of the carriage A along the track are ensured by hauling on a cable 16 which runs along the ground and is fixed thereto at the two ends of the path of movement of the handling apparatus. This cable is partially wound round a grooved control wheel 17 carried by a plate 18 fixed to the chassis of the carriage A, the cable 16 is lapped round the wheel 17 by means of the arrangement of two pulleys 19 (Fig. 3). The wheel 17 is driven in rotation by a double cage reversible electric motor 20 fixed to the plate 18. The shaft of this motor is connected by a hydraulic coupling 21 to the input shaft of a reduction gear mechanism 22 the output shaft 23 of which is connected by a coupling 24 to the shaft of the wheel 17. A hydraulic disc brake is provided at 25 on the primary shaft of the reduction gear mechanism. The control means for the motor 20 and the brake 25 will be described hereinafter.

b. Carriage B (Figs. 1, 2, 5 to 7). In plan this carriage has an H shape which can be seen in Fig. 6. The crosspiece of this H comprises two girders 26 perpendicular in plan to the rails 1, and the two limbs of the H include a pair of bars 27 parallel to the rails 1. At each of its ends each limb includes a plate 28 in which is fixed a nut 29 in which is screwed one of the lead-screws 12 of the lower carriage A. As will be understood, the four lead-screws 12 rotate at the same speed under the action of the motor 13 and, inasmuch as they are connected in rotation by the chain 14 and the sprockets 15, these lead-screws ensure the simultaneous vertical displacement of the four nuts 29 and in consequence the vertical displacement of the carriage B in the direction of arrow $f^2$ (Fig. 1) or in the opposite direction, according to the direction of rotation of the motor 20.

c. Carriage C (Figs. 1, 2 and 5 to 7). In plan this carriage has the shape of a T, the central limb of which is located directly above the crosspiece of the carriage B and is in consequence perpendicular to the rails 1. For the sake of clarity in Fig. 6 this central limb has been shown slightly narrower than the crosspiece of the carriage B, though they are preferably of the same width. This central limb comprises two girders 30. At one of their ends these girders are joined by two crosspieces 31 carrying various devices to be described hereinafter. At their other ends the girders are united by longer crosspieces 32 which form the crosspiece of the T and are superimposed in plan to the bars 27 of the carriage B. The girders 30 are connected by diagonal members 32. It will be noticed that similar diagonal members also connect the two girders 26 of the carriage B.

The carriage C is pivotally mounted about the vertical axis XX on the carriage B through the medium of a vertical journal 33 carried by one of the two carriages, for example the carriage B, and on which is pivotally mounted the other carriage, for example the carriage C. Adjacent the crosspiece end of the T-shape the carriage C rests through the medium of two freely rotative rollers 34 on supporting plates 35 carried by the carriage B. The spindles 36, carried by the crosspiece 32 and on which are freely rotative the rollers 34, converge and the axes thereof intersect on the axis XX. The pivoting of the carriage C with respect to the carriage B is limited to several degrees, for example about 2 degrees, on either side of the illustrated mean position. This angular displacement is obtained by means of a nut 37 which is carried by a member 38 fixed to the carriage C and in which is screwed a lead-screw 39 (Fig. 6). The latter is journalled without being free to move in the longitudinal direction, in bearings 40 carried by the girders 26 of the carriage B. This lead-screw is driven in rotation in one direction or the other by a reversible electric motor 41 carried by a support plate 42 fixed to the carriage B. This motor is connected to the lead-screw by a speed reducer 43 and a limited torque coupling 44 of any known type. This coupling allows slip between the lead-screw and the motor shaft at the end of the travel of the carriage C.

This carriage C includes at its two ends two pairs of grooved rollers 45 freely rotative on two shafts 46 parallel to the rails 1. Preferably these rollers 45 are mounted on conical journals by means of which it is possible to take up play. In the region of the left rollers as seen in Fig. 6, but located above the latter are two other freely rotative plain rollers 47 whose spindles are carried by two brackets 48 attached to the carriage. The jib D rests on these rollers 45 and 47 and is capable of moving in the direction of arrow $f^4$ (Figs. 1 and 2) or in the opposite direction.

d. Jib D (Figs. 1, 2, 7, 8, 10). This jib is a rectangular-sectioned structure which may be for example 1.5 metres high, 0.7 to 0.8 metre wide and about 20 metres long. These dimensions are of course only illustrative. The jib includes two lower U-sectioned girders 49 reinforced at their lower flanges by two bars 50 adapted to roll along the grooves of rollers 45, two upper girders 51 in the form of angle-irons, lower crosspieces 52 and upper crosspieces 53, uprights 54 and struts 55. It will be observed that rollers 47, carried by the carriage C, roll along the inside of the U-sectioned girders 49 of the jib and thus prevent any twisting of these girders.

Near its front end seen on the right hand side in Figs. 1, 2, 8 and 9, the jib is so arranged as to form a control cabin 56, provided with a floor 57 (Fig. 11) carrying a seat 58 for the operator of the apparatus. The equipment of the cabin will be described hereinafter.

At its front end, the jib D comprises a handling device adapted to receive the articles to handle. This device includes a movable support comprising two posts 59 connected by crosspieces 60 and 61. These crosspieces are connected to front uprights 62 of the jib by a pivotal device comprising a rigid upper frame 63 and a second similar lower frame $63^a$. Each of these frames is pivoted firstly at 64 or $64^a$ on the support (59, 60, 61) and, secondly, at 65 or $65^a$, on brackets $62^a$ fixed to the uprights 62. The four shafts 64, $64^a$, 65 and $65^a$ are parallel and their axes, seen in Fig. 8, form a deformable parallelogram. On the crosspiece 60 are suspended by upper hooks 66 two L-shaped members 67 whose free ends are tapered at 68 so as to enable their easy engagement under the article to be raised. These arms form a fork-like structure. Means are provided for adjusting the position of these arms relative to the horizontal plane. These means may consist in the fact that the upper frame 63 is pivotally mounted on a camshaft 65 (Fig. 8) the journals $65^b$ of which are eccentric relative to its axis.

The position of the shaft about the axes of its journals is adjustable from the cabin 56 by an adjusting device diagrammatically represented by a lever $65^c$ keyed to one of the journals $65^b$, and a push rod $65^d$ provided with a locking device comprising a pawl and ratchet or the like. When the frames 63 and $63^a$ pivot about the shafts 65 and $65^a$ in one direction or the other the parallelogram is deformed but the active branches of the forks retain the angular direction given to them by the aforementioned adjusting device.

The pivotal movements of the frames 63 and $63^a$ are ensured by means of two chains 69 hooked at 70 to the lower frame $63^a$. These chains pass around two sprockets 71 freely rotative on their spindles carried by the jib D, and are connected by a yoke 72 to the piston rod 73 of a hydraulic or pneumatic linear motor 74 fixed to the jib in the cabin 56. This linear motor is fed with fluid by a compressor 75 (Figs. 1 and 2) carried by the jib at the rear of the cabin 66.

The longitudinal displacement of the jib D in the direction of the arrow $f^4$ and in the opposite direction is obtained in the following manner. A chain 77 passes around a freely rotative sprocket 78 and a driving sprocket 79 carried by the jib. This chain is fixed at one point 80 (Fig. 8) to the carriage C by the member 81. When the driving sprocket 79 is driven in rotation it displaces the endless chain 77 and a causes the jib D to move with the latter forwardly or rearwardly according to the direction of its rotation. This driving sprocket 79 is driven in rotation by a drive unit comprising a double cage reversible electric motor 82 fixed on a support 83 carried by the jib D. This motor drives, through a hydraulic coupling 84, a grooved pulley 85 and V-belts 86, a pulley 87 of a planetary gear reduction device of known type. This device transmits the movement to the sprocket 79 with a suitable speed reduction (Fig. 10.)

e. Description of the cabin 56, the various modes of feeding the motors, and the operation of the aforementioned brakes. The three-phase A. C. supply for the various electrical control devices, the motors and other devices of the apparatus, is brought to the carriage A by any means not illustrated (overhead or underground contacts, or cable and winding drum). From this carriage the current is fed to the jib D by two electric cables 88 and 89 each of which has a fixed point 90 or 91 on the carriage C and is wound round a drum 92 or 93 carried by the jib so that the portion 90—92 of each of these cables is always held taut whatever be the longitudinal position of the jib D. From the drums 92 and 93 the current is fed through the various control devices placed in the cabin 56 with the aid of conductors disposed along the girders of the jib.

In this cabin are provided three levers 94, 95 and 96, and two pedals 97 and 98.

The lever 94 has four positions. Two of these positions control the power supply to the motor 20, which ensures the lateral displacement of the lower carriage A along the track 1 in the direction of arrow $f^1$ or in the opposite direction, i. e. toward the left or the right, relative to the operator seated on the seat 58. The two other positions of this lever control the power supply of the motor 87 in one direction or the other for the longitudinal displacement of the jib D, that is forwardly in the direction of arrow $f^4$ or in the opposite direction.

The lever 95 has also four positions. Two of these positions control the power supply to the motor 41 in one direction or another, this motor being adapted to drive the lead-screw 39 which pivots in one direction or another the upper carriage C about the vertical axis XX on the intermediate carriage B, the other two positions of lever 95 control the power supply to the motor 13 adapted to drive the screws 12 which lower or raise the jib.

Finally, the lever 96 controls the power supply to the motor-compressor unit 75 adapted to feed the linear motor 74 which actuates the pivotal parallelogram device 63, 63ᵃ.

The pedal 97 is adapted to actuate through any known device not illustrated the brake provided for the motor 82, which controls the displacement of the jib D.

The pedal 98 is adapted to actuate the brake 25 disposed on the primary shaft of the reduction gear device 22 interposed in the drive between the motor 20 and the sprocket 17 which drives the cable 16. Since the pedal 98 is carried by the jib D and the brake 25 is carried by the carriage A, a special connection must be provided therebetween. This connection is illustrated in Fig. 9. A hydraulic brake master cylinder 99 adapted to control the brake drum 25 is fixed to the carriage C. This master cylinder is adapted to actuate the brake 25 with the aid of a liquid under pressure and to this end the master cylinder 99 is connected to the brake 25 by a flexible pipe not illustrated. To the master cylinder control lever 100, which is pivoted about a pin 101 on the carriage C, is attached at 102 one of the ends of a cable 103. The latter is passed firstly around a first movable pulley 104 carried by a fork 105 connected to the pedal 98, then around another pulley 106 freely rotative on a spindle 107 carried by the jib D, the second end of the cable being attached to the carriage C at a fixed point 108. When the pedal 98 is depressed the distance between the pulleys 104 and 106 is altered and the master cylinder 99 is actuated. It will be observed that the jib D may freely move relative to the carriage C without modifying the position of the brake since the cable is unwound from one of the pulleys 104 or 106 and is wound an equal amount on the other.

To summarize, the operator seated on the seat 58 in the cabin 56 may:

a. Move the whole of the apparatus in the lateral direction from the right to the left and inversely with the aid of the lever 94.

b. Move the jib D in the longitudinal direction forwardly or rearwardly with the aid of the same lever 94.

c. Lower or raise this jib by raising or lowering the carriage B with the aid of the lever 95, which acts upon the power supply to the motor 13.

d. Modify, by pivoting the carriage C on the carriage B, the angular direction of the longitudinal axis of the jib by means of the same lever 95.

e. Modify as desired the height of the forks 67 of the handling device by modifying the feed to the linear motor 74 with the aid of the lever 96.

All the movements are gradual and smooth owing to the hydraulic couplings. The braking is also gradual and smooth owing to the brake drums whose action is controlled by pedals 97 and 98.

The apparatus is used in the following manner:

Let it be assumed that an article $d$ rests on the loading floor $a$ more or less near the vehicle V on feet or blocks which permit the engagement of the handling device under this article. The operator of the apparatus, by moving the carriage A, brings the jib below the article $d$. Then, by advancing or retracting this jib, he brings the forks 67 slightly in front of the article. By lowering the carriage B, the forks are brought near to the ground and are then, by advancing the jib D, engaged under the article. The latter is raised with the raising of the carriage B. By a lateral translation of the apparatus, the jib being moved back the required amount, this article is brought behind the vehicle V above the level of its floor $b$. The jib is fed forward and the article is introduced into the vehicle and deposited there in positions such as $d^1$, $d^2$ . . . $d^4$ by operating the pivotal parallelogram (Fig. 1). If the vehicle is not directed parallel to the mean position of the jib before the introduction of the latter into the vehicle, the operator pivots the carriage C on the carriage B about the axis XX to ensure that the jib is aligned with the vehicle.

Thus the apparatus permits an extremely easy handling of very heavy articles, their introduction and their positioning in a vehicle from the rear of the latter so that even if the vehicle comprises a fixed roof $c$ the latter in no way interferes with the operation. Further, no load is applied to the floor $b$ of the vehicle except that due to the article itself. Thus vehicles having a weak floor which could not support the local loads exerted when the article is brought into place with the aid of the conventional machines on wheels, can now be easily loaded by means of the apparatus according to the invention. The vehicle floor may be uneven and include wheel arches without this interfering in any way with the loading. The handling apparatus permits, of course, if required, the unloading of the vehicle V.

As can be seen, the utility of the apparatus is not limited by the height of the floor of the vehicles, since by the adjustment of the height of the carriage B as well as the pivoting of the front parallelogram, the front handling device may be brought to the required height, whatever be the height of this floor. It will be observed, moreover, that this handling device may be very easily lowered below the jib as indicated in Fig. 8, which limits the necessary displacement in height of the carriage B and increases still more the possible displacement in height of the article.

Naturally the handling device, shown in the illustrated embodiment by the front fork 67, may be of any known type. Some of them have been illustrated in Figs. 12 to 15.

In the example shown in Fig. 12 the front support 59 of the pivotal parallelogram device comprises a bracket 109 provided with a hook 110.

In the example shown in Fig. 13, the handling device includes a pivotal bucket or grab bucket 111 pivoted at 112 on a support 113 adapted to be hooked to the support 59, this bucket 111 being connected to the piston rod 114 of a linear fluid motor 115.

Finally, the Figs. 14 and 15 represent another embodiment in which the handling device comprises two lateral arms 116 pivoted about horizontal axes 117 on a plate 118 hooked to the support 59. These arms are adapted to grip the article and are preferably of sufficient length to grip along metal sections and the like and load them lengthwise in the vehicle, the articles being taken midway of their length.

Although constructional details of the various embodiments have been herein described and illustrated, it is to be understood that modifications and changes may be made therein without departing from the spirit of the invention or the scope of the appended claims.

If need be, the jib D may comprise adjacent the rear end a counterweight adapted to balance the weight of the article to handle. The control cabin may be provided with a searchlight for illuminating the usually dark interiors of closed vehicles.

Finally, the device for adjusting the inclination of the arms of the handling device may be constructed in a manner other than that illustrated and in particular there may be provided a telescopic upper frame 63 or lower frame 63ª.

Having now described my invention what I claim as new and desire to secure by Letters Patent is:

1. Handling installation more particularly for loading heavy articles onto vehicles which may comprise a fixed roof and a floor of any strength and situated at any height from the loading ground, said installation comprising in combination: two parallel rails fixed to said loading ground; a hauling cable parallel to said rails and fixed to said loading ground at its ends; a first lower carriage movable in horizontal translation on said rails and along said hauling cable; a second intermediate carriage movable in vertical translation on said first carriage; a third upper carriage mounted to pivot about a vertical axis on said second carriage, the longitudinal axis of said third carriage being in its mean position perpendicular in plan to said rails of the first carriage; a horizontal jib resting on said third carriage, this jib being movable with respect to its longitudinal axis on this third carriage whose axis coincides in plan with that of the jib; a control cabin provided in said jib adjacent the front end thereof, a handling device for the article to handle, this handling device being connected to said front end of the jib; electro-mechanical devices for moving each carriage independently of the others and of the jib on said third carriage, and control devices placed in said cabin for controlling said electro-mechanical devices.

2. Installation according to claim 1, wherein the electro-mechanical device which is adapted to ensure the displacement of said first carriage on said rails comprises in combination, carried by said carriage: a reversible electric motor, a speed reducer, a hydraulic coupling connecting said motor and said speed reducer, a grooved pulley driven by said speed reducer, two rotatively mounted pulleys adapted to dispose said hauling cable around a portion of the periphery of said grooved pulley, and a brake adapted to brake one of the shafts of said speed reducer.

3. Installation according to claim 2, wherein there are provided for the control of said brake, in combination: a pivotal brake pedal situated in said cabin, a master cylinder fixed to said upper carriage and provided with an actuating lever pivotal on this carriage, a flexible connection fixed at one of its ends to said lever and at its other end to said upper carriage and two pulleys for this flexible connection, one of said pulleys being rotatively mounted on said upper carriage and the other being rotatively mounted on and operatively connected to said pedal.

4. Handling apparatus for loading heavy articles onto vehicles which may comprise a fixed roof and a floor of any strength situated at any height above the loading ground, this apparatus comprising in combination: a first lower carriage movable in horizontal translation in a given direction; a second intermediate carriage movable in vertical translation on said first carriage; a third upper carriage mounted to pivot about a vertical pivot axis on said second carriage, the longitudinal axis of said third carriage being in its mean position perpendicular in plan to said direction; a horizontal jib resting on said third carriage, this jib being movable with respect to its longitudinal axis on this third carriage whose axis coincides in plan with that of the jib; a control cabin provided in said jib adjacent the front end thereof, a handling device for the article to handle, this device being connected to said front end of the jib; electro-mechanical devices for displacing each carriage independently of the others and of the jib on said third carriage, and control devices situated in said cabin for controlling said electro-mechanical devices.

5. Apparatus according to claim 4, wherein the electro-mechanical device which is adapted to ensure the movements in vertical translation of said second carriage comprises in combination: a reversible electric motor carried by said first carriage, several vertical lead-screws journalled in this first carriage, one of said lead-screws being rotated by said motor, connecting means for connecting in rotation said lead-screw rotated by the motor to the other lead-screws, nuts for said lead-screws, these nuts being threadedly engaged on each of said lead-screws and carried by said second carriage.

6. Apparatus as claimed in claim 5, wherein said connecting means comprise sprockets located in the same horizontal plane and keyed to said lead-screws, each sprocket being keyed to its respective lead-screw, and an endless chain connecting these sprockets.

7. Apparatus as claimed in claim 5, wherein said first carriage has in plan a rectangular shape, said second carriage has in plan an H-shape, there being four lead-screws which are disposed at the four corners of the first carriage, the nuts corresponding to said lead-screws being carried by the ends of the limbs of the second carriage.

8. Apparatus as claimed in claim 4, wherein said third carriage has the shape of a T the central portion of which is mounted to pivot about said vertical axis on said second carriage, said apparatus further comprising two horizontal support plates, spaced apart from said pivot axis and fixed to said second carriage, two horizontal journals fixed to the third carriage on the crosspiece of the T, and two support rollers freely rotative on said journals and adapted to roll on said support plates, said journals being so disposed that their longitudinal axes intercept on said vertical pivot axis.

9. Apparatus as claimed in claim 4, wherein the electro-mechanical device which is adapted to ensure the pivotal movements of the third carriage about said vertical pivot axis comprises in combination: mounted on the intermediate carriage, a reversible electric motor, a speed reducer driven by this motor, a torque limiting device and a rotative lead-screw connected to said speed reducer by said torque limiting device, and, secured to the upper carriage, a nut in which is screwed said lead-screw.

10. Apparatus as claimed in claim 4, wherein the upper carriage carries adjacent said vertical pivot axis, two rotatively mounted grooved rollers having horizontal axes and on which said jib rests.

11. Apparatus as claimed in claim 4, wherein the upper carriage carries two auxiliary rotatively mounted rollers, and the jib comprises two lower U-sectioned girders wherein said auxiliary rollers are adapted to roll for preventing any lateral warping of said jib.

12. Apparatus as claimed in claim 4, wherein said handling device is movable relative to said front end of the jib.

13. Apparatus as claimed in claim 12, wherein a support is pivotally mounted on the front end of the jib, the handling device is fixed on said support, and the latter is combined with an actuating device by means of which said support may be pivoted.

14. Apparatus as claimed in claim 13, wherein said support comprises three members pivoted together about two horizontal axes, two of these members being also pivoted on said jib about two other axes parallel to the first axes, these four axes defining a deformable parallelogram and one of said members being connected to said actuating device.

15. Apparatus as claimed in claim 14, wherein said actuating device comprises a linear fluid motor housed in the cabin and the piston of which is connected to the last mentioned member of the pivotal support.

16. Apparatus as claimed in claim 14, wherein said support is adapted to permit a pivotal movement relative to the horizontal of the supporting faces of the handling device.

17. Apparatus as claimed in claim 14, wherein one of the pivot axes of the support on the jib is adjustable in position.

18. Apparatus as claimed in claim 14, wherein one of the members of the support pivoted to the jib has an adjustable length.

19. Apparatus as claimed in claim 4, wherein the electro-mechanical device adapted to displace the jib on the upper carriage comprises in combination: an endless chain which is connected at one point to the upper carriage, two sprockets carried by the jib and around which said chain passes, one of the sprockets being rotatively mounted and the other driven in rotation, and a driving device for the latter, this driving device, which is carried by the jib, comprising: a reversible electric motor, a hydraulic coupling driven by this motor and a speed reducer for connecting this coupling to the sprocket to be driven in rotation.

20. Apparatus as claimed in claim 4, wherein winding devices are provided for the electric power supply cables and are carried by said jib.

References Cited in the file of this patent

UNITED STATES PATENTS

| | | |
|---|---|---|
| 1,384,768 | Luce | July 19, 1921 |
| 2,405,893 | Leftwich | Aug. 13, 1946 |